April 21, 1953 R. E. MEYNIG 2,635,626
SAFETY SYSTEM FOR PIPE LINES
Filed Dec. 13, 1946 2 SHEETS—SHEET 1
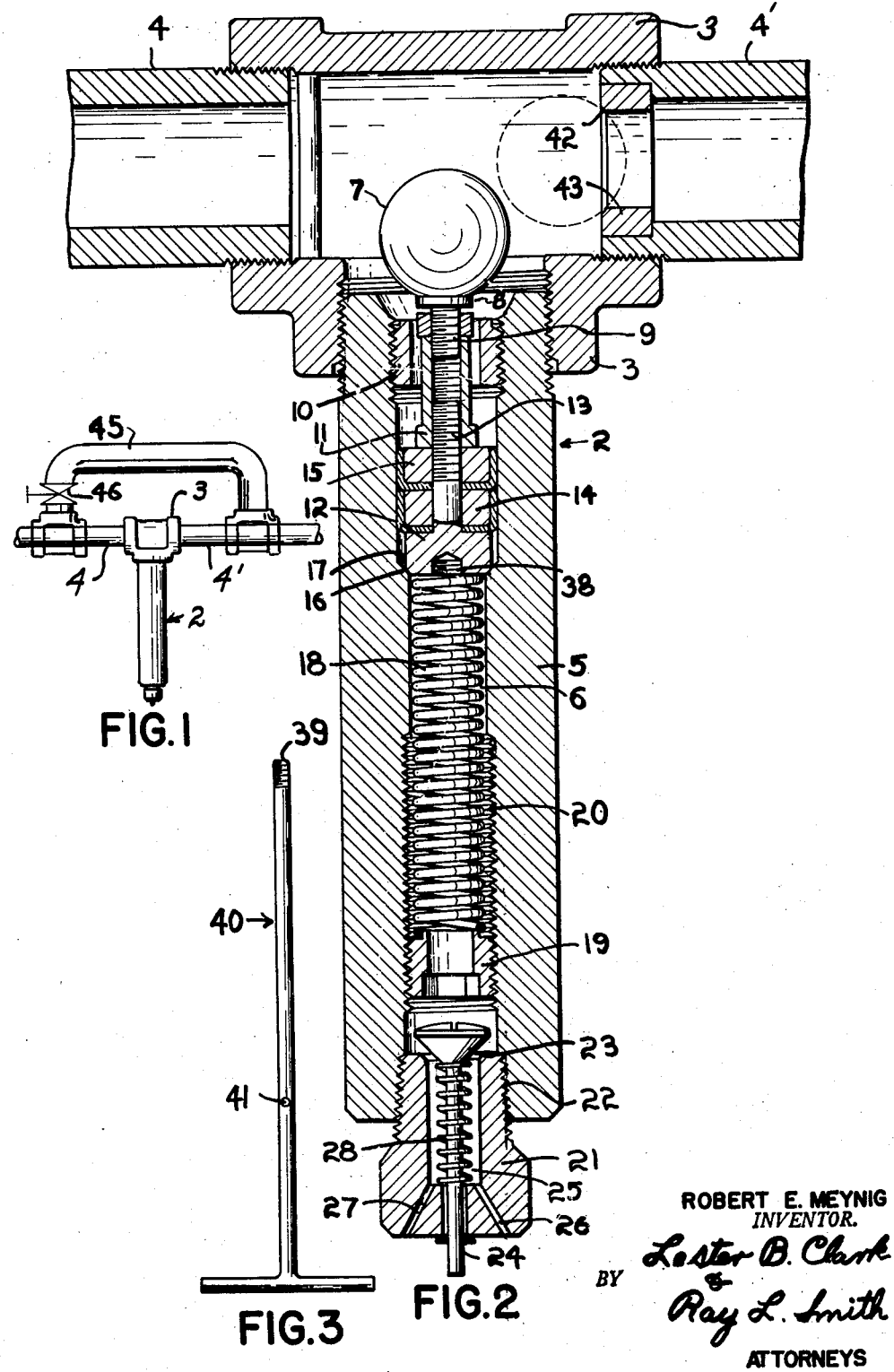
ROBERT E. MEYNIG
*INVENTOR.*
BY Lester B. Clark
& Ray L. Smith
ATTORNEYS

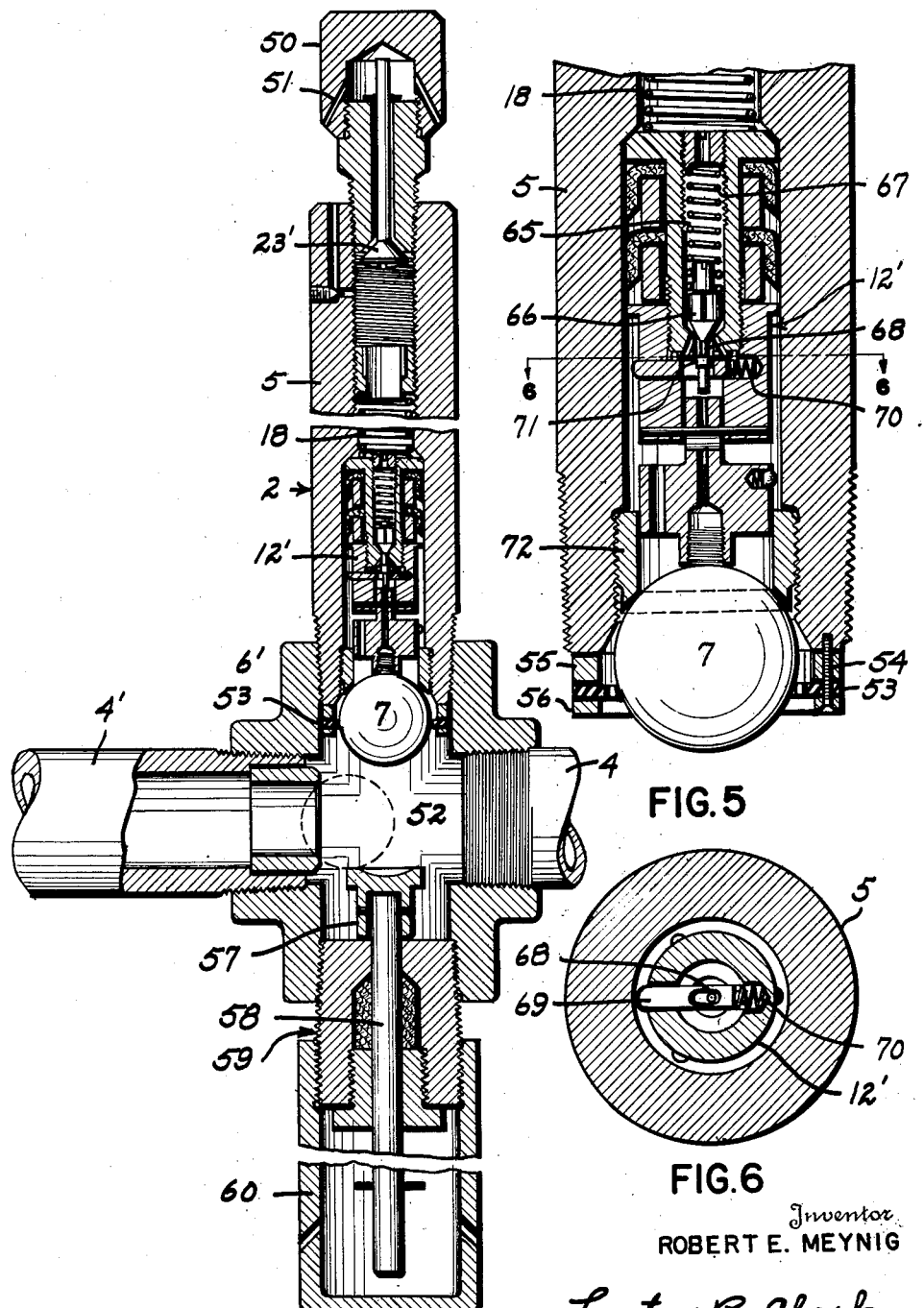

Patented Apr. 21, 1953

2,635,626

UNITED STATES PATENT OFFICE 2,635,626

SAFETY SYSTEM FOR PIPE LINES

Robert E. Meynig, La Porte, Tex.

Application December 13, 1946, Serial No. 715,985

6 Claims. (Cl. 137—458)

This invention relates to a control valve, and more particularly to a valve to be used in a flow line and adapted to close the line upon the development of a predetermined pressure condition therein.

It is an object of the invention to provide a valve to be positioned in a flow line and adapted to shut off the flow through the line when the pressure therein falls below a predetermined value.

Another object of the invention is to provide a valve of the class described, adapted to shut off the flow through the line when the pressure in the line exceeds a predetermined value.

A further object is to provide a control valve which is operable to shut off flow in a line when the pressure therein exceeds or fall below predetermined values.

A still further object is to provide a valve for shutting off a flow line either manually or automatically.

Still another object is to provide a valve in which a change in line pressure beyond certain limits releases a valve member for movement from the velocity of fluid in the line to close the passage in the line.

The invention also comprehends a control valve which positively shuts off flow in the line until manual opening of the valve is effected.

A still further object is to provide a control valve in which the valve member is operable to close the line when the fluid moving therethrough exceeds a predetermined velocity.

Other objects and advantages of the invention will be more fully apparent from the following description considered in connection with the accompanying drawings in which:

Fig. 1 shows an elevational view of a valve embodying the invention, and in position in the flow line;

Fig. 2 is a vertical sectional view of an embodiment of the invention;

Fig. 3 is an elevation of a resetting tool used with the device;

Fig. 4 is an enlarged vertical sectional view of an alternate embodiment in which the flow line is closed by a fluctuation therein above or below predetermined values;

Fig. 5 is an enlarged detail of the actuating device of the valve shown in Fig. 4;

Fig. 6 is a sectional view taken on line 6—6 in Fig. 5.

In the drawing, the device is shown generally at 2 as connected in a flow line having successive pipe sections 4 and 4' which are respectively on the upstream and downstream sides of the valve. The T connection 3 interconnects the sections 4 and 4'. An important, but not the sole, use of the invention is in connection with the flow of wells such as oil and gas wells under existing formation pressures. In such case preferably, the section 4 is closely connected to the Christmas tree or well head, it being intended that in event an undesirable pressure condition developes in the line 4 beyond the valve, the ball 7 will move, by virtue of the flow of fluids in the line, into engagement with the seat ring 43, having seating surface 42 thereon. Attention is now directed to the valve structure which, in one form of the invention, moves the ball 7 into the fluid stream whereby the ball is moved into engagement with the seat 42.

The housing or body 5 is shown as threadedly connected in the side opening of the T 3 although it is to be understood that these two elements may be formed as an integral unit if so desired. The housing 5 has an axial bore 6 therein, there being a counterbore at the upper end of the housing to receive the piston 12 which has a tapered nether surface 16 adapted to engage the shoulder 17 at the lower end of the counterbore.

The piston 12 comprises upward extension 13 surrounded by annuli 14 and 15 and interposed seal cups which face upwardly and form a seal against leakage through the counterbore.

The upper end of the extension 13 is threadedly connected to the sleeve 11 whereby the plunger parts are secured in assembled relation. A stud 9 threaded into the upper end of the sleeve 11 has head 8 thereon to receive and support the ball 7 when the valve is opened as shown in Fig. 2.

A ring 10 threaded in the upper end of the counterbore permits free axial movement of the piston assembly, but determines the upper limit of travel of the assembly. It is intended that the piston shall be free to rise a sufficient distance that the ball 7 is supported within the fluid stream, and is carried by such stream to closure position upon the seat 42 as indicated in dotted outline in Fig. 2.

Pressure within the line 4 and the connection 3 normally holds the plunger 12 downwardly against a spring 18 which is tensioned by the plug 19 adjustably positioned in threads 20.

The operation of the device thus far described is believed apparent from the description, but attention is directed to the fact that when normal pressure exists in the line 4—4', the plunger 12 is held downwardly and the ball 7 is retracted under gravity to the position shown.

If, however, the pressure on the downstream side of the valve 2 diminishes appreciably, as when the line is broken or other undesirable conditions develop whereby there is created a loss of fluid through the line, the piston 12 rises whereby the ball 7 is lifted into the fluid stream within the line 4—4' and is carried by the high velocity fluid therein to the indicated seating position whereby flow in the line is terminated.

In order to safeguard against the loss of line fluid from leakage past the piston 12, and to give an indication of such leakage, a safety valve 23 is provided at the lower end of the body 5, this valve has a stem 24 extending slidably through an opening in the bottom of the plug 21 threaded at 22 into the lower end of the housing 5. A spring 28 surrounds the stem 24 and normally holds the valve off its seat. If leakage develops around the piston 12, the velocity of the leaking fluid will move the valve 23 downwardly to closure, the fluids leaking prior to closure of the valve 23 passing downwardly through the bore 25 and out through passages 26 and 27. In this manner pressure on opposite sides of the piston becomes equalized and closure of the flow line takes place. Such closure immediately reveals the failure of the valve.

If the valve 2 closes as from a break in the flow line or from leakage past the piston 12 as above explained, normal operations may be restored by removing the safety valve assembly at the lower end of the housing 5 and introducing the tool 40 (Fig. 3) into the bore 6 and interconnecting the male threads 39 on the tool with the female threads 38 in the lower end of the piston 12. Downward pull is then exerted upon the tool and piston assembly to compress the spring 18, and a pin is then inserted in the opening 41 in the tool at the lower end of the housing 5. In the meantime, of course, the ball 7 retains the line closed. Assuming that necessary repair and/or adjustments have been made, the valve 46 in the by-pass 45 is then opened to reestablish flow and normal pressure conditions in the flow line. Thereupon the pressures on the opposite sides of the ball 7 are equalized whereby the ball moves under gravity to the position shown in Fig. 2.

The valve 46 may then be closed, the tool 40 removed, and the valve 23 reinstalled whereupon normal conditions in the line are reestablished.

Attention is directed to the fact that the valve 2 operates automatically to close the flow line, but is reset manually to restore flow in the line. Such a device is of particular utility for shutting off flow in lines from off-shore wells in event the line leading to the operator develops a break. Alternately, of course, it is possible to close off flow from a well at a remote point by merely opening the line momentarily whereby the valve is actuated and closes off the line until subsequently restored manually to open position.

Where a plurality of wells are producing into a common separator, the procedure which is described may be used for closing off all of the wells.

A modified form of the invention is shown in Figs. 4 and 5 and 6, this form being designed to operate to close the line 4—4' whenever the pressure in the line exceeds or falls below certain predetermined values. The T 6 of Fig. 2 is replaced by a cross 6' and the body 5 is inverted whereby the deposit of sand or other foreign matter in the working parts of the device is avoided.

The valve 23' is similar to the valve 23 but is normally open due to gravity acting thereon. Hence no spring is required to keep this valve open. The cap 50 has downwardly extending passages 51 to exhaust fluid in the event of failure of the piston 12' and until such fluids attain a sufficient velocity to close the valve.

The piston 12' is of special construction, to be further described, and is urged downwardly by the compression spring 18. In event there is a drop in pressure in the chamber 52, within the cross 6', or the pressure on opposite sides of the piston 12' is equalized, the piston will move downwardly and will force the ball 7 from its indicated position where it is held by the resilient grip of the annulus 53 of flexible material such as rubber and the like held in place at the lower end of the body or housing 5 by means of screws 54 passing upwardly through rings 55 and 56. When the ball 7 is so released, it moves under gravity to position upon the head 57 on stem 58 which passes through a stuffing box assembly 59 in the lower portion of the bore of the cross 6'. Thereupon, the ball 7 is moved by the velocity of fluid flowing in the line to the position indicated in dotted outline whereby the line is closed.

When the flow line 4—4' is to be restored to normal operation as in the manner above explained by the use of the by-pass 45 and valve 46, the valve 7 moves to position upon the head 57 when normal conditions are established in the line. Thereupon, the cap 60 being removed from the packing assembly 59, the stem 58 and associated head 57 are pushed upwardly until the valve 7 is returned in position within the ring 53.

When the pressure in the line 4—4' falls below predetermined value the operation of this form of the invention is identical to that previously described. However, the piston 12' is of a special construction whereby an excessive pressure in the flow line will likewise effect operation of the valve to close the line. This mode of operation is made possible by the provision of a central bore 65 in the piston assembly, a small valve 66 being provided in this bore and urged by compression spring 67 to seating position in the lower end of the bore 65. The spring 67 is so dimensioned that this valve remains closed at all times except when a pressure in excess of a predetermined value developes in the flow line. When such a condition developes the valve 66 opens and permits line pressure to develope on the upper side of the piston 12' whereupon the piston moves downwardly as previously indicated, to effect closure of the flow line.

To assure positive downward movement of the piston 12 when the valve 66 rises from its seat from excessive pressure within the line 4, 4', a pin 68 forms a downward extension at the lower end of valve 66 and passes through an oblong opening in latch pin 69 which is normally urged to the left by compression spring 70 seated in a recess in the piston body. An enlargement 71 on pin 68 fits within the oblong opening in the latch pin when the valve 66 is closed. If this valve is lifted from its seat, the enlargement is withdrawn from within the pin and permits the pin to move under influence of spring 70. The valve 66 is thus held spaced from its seat as the piston 12 moves downwardly to force the ball 7 from within the annulus 53 so that closure of the line 4, 4' results.

As the piston 12 moves downwardly, pressures on the opposite sides gradually equalize and the valve 66 tends to close, but is restrained therefrom by engagement of the enlargement 71 upon the latch pin 69. As the piston approaches its lowermost position, however, the end of the pin 69 engages the inner periphery of the stop ring 72 and is forced inwardly whereby the valve 66 is permitted to reseat.

Thereafter the valve may be reopened in the manner already explained and actuation effecting closure of the line 4, 4' will follow only when pressure conditions in the line, and within the chamber 52, fall below or rise above values predetermined by the tensioning of the springs 18 and 67.

Broadly the invention comprehends a control valve to be installed in a flow line and operable to close the line when predetermined pressure conditions develop within the line.

The invention claimed is:

1. A valve for flow lines comprising, a body adapted to be connected in the flow line and having a passage therethrough, there being a bore in the body extending transversely of said passage, a seat in said passage coaxial therewith, a valve member positioned said bore and projectible therefrom into said passage to engage said seat, a piston in said bore in projecting relation to said valve member, means urging said piston toward the passage, said piston being responsive to fluid pressure in the line, to be held in retracted position against said means when the pressure in the line exceeds a predetermined value, a pressure equalizing channel across said piston, and valve means normally closing said channel and openable by pressure in the line exceeding said value by a predetermined amount.

2. A valve for flow lines comprising, a body adapted to be connected in the flow line and having a passage therethrough, there being a bore in the body extending transversely of said passage, a seat in said passage coaxial therewith, a valve member positioned in said bore and projectible therefrom into said passage to engage said seat, a piston in said bore in projecting relation to said valve member, means urging said piston toward the passage, said piston being responsive to fluid pressure in the line, to be held in retracted position against said means when the pressure in the line exceeds a pre-determined value, and normally open check valve means in the outer end of the bore responsive to leakage of line fluid past said piston to close said bore to equalize the pressure on opposite sides of the piston.

3. A valve for flow lines comprising a body adapted to be connected in the flow line and having a passage therethrough, a bore in the body extending transversely of said passage, a seat in said passage coaxial therewith, a ball valve, means releasably retaining said valve in said bore in laterally spaced relation to said seat, and spring actuated piston means in said bore responsive to predetermined high and low pressures for moving the valve into the fluid stream in said passage.

4. A valve for flow lines comprising a body adapted to be connected in the flow line and having a passage therethrough, a bore in the body extending transversely of said passage, a piston in said bore, a valve seat in said passage, a ball valve, a spring in the bore above said passage urging the piston toward said passage, said piston being responsive to pressure in the passage exceeding the force of said spring to normally remain in an outward position, and means releasably retaining the valve in said bore in laterally spaced relation to said seat and proximate said piston.

5. A valve for flow lines, comprising, a body adapted to be connected in the flow line and having a flow passage therethrough, a bore in said body extending transversely of said passage, a seat in said passage coaxial therewith, a ball valve in the inner end of said bore adjacent said passage, means releasably retaining said valve in said bore in laterally spaced relation to said seat, spring biased piston means in said bore urging said valve toward said passage in opposition to flow line pressures in the passage, said piston means being responsive to predetermined high and low pressures effective on the side of the piston remote from said valve for moving the valve into said passage, and normally open check valve means in the outer end of said bore responsive to leakage of line fluid past said piston to close said bore to equalize the pressure on opposite sides of said piston.

6. A valve according to claim 5 having a resetting member slidably extendible into said bore to reset said piston and valve in their original positions.

ROBERT E. MEYNIG.

References Cited in the file of this patent

UNITED STATES PATENTS

| Number | Name | Date |
|---|---|---|
| 756,282 | Rankin | Apr. 15, 1904 |
| 871,717 | Lyter | Nov. 19, 1907 |
| 908,337 | Shad | Dec. 29, 1908 |
| 1,290,660 | Rettig | Jan. 7, 1919 |
| 1,312,644 | Raab et al. | Aug. 12, 1919 |
| 1,339,383 | Beese | May 11, 1920 |
| 1,518,461 | Smith | Dec. 9, 1924 |
| 2,296,648 | McMahon | Sept. 22, 1942 |
| 2,327,055 | McMahon | Aug. 17, 1943 |
| 2,475,585 | Baird | July 12, 1949 |

FOREIGN PATENTS

| Number | Country | Date |
|---|---|---|
| 198,723 | Great Britain | June 11, 1923 |
| 214,468 | Great Britain | Apr. 24, 1924 |

OTHER REFERENCES

Oil Weekly Magazine, April 22, 1946, 1 sht. dwg., Advertisement of Derneal Supply Co.